United States Patent
Damerau et al.

(10) Patent No.: US 6,697,998 B1
(45) Date of Patent: Feb. 24, 2004

(54) AUTOMATIC LABELING OF UNLABELED TEXT DATA

(75) Inventors: Frederick J. Damerau, North Salem, NY (US); David E. Johnson, Cortlandt Manor, NY (US); Martin C. Buskirk, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 09/591,497

(22) Filed: Jun. 12, 2000

(51) Int. Cl.[7] ............................................. G06F 17/21
(52) U.S. Cl. ......................................... 715/512; 706/45
(58) Field of Search ................................. 715/512, 530, 715/531; 706/45; 707/103; 345/630, 648

(56) References Cited

U.S. PATENT DOCUMENTS

| | | | |
|---|---|---|---|
| 5,684,940 A | * | 11/1997 | Freeman et al. ............. 345/630 |
| 5,724,072 A | * | 3/1998 | Freeman et al. ............. 345/648 |
| 6,263,334 B1 | * | 7/2001 | Fayyad et al. ................. 707/5 |
| 6,598,054 B2 | * | 7/2003 | Schuetze et al. ......... 707/103 R |
| 6,611,825 B1 | * | 8/2003 | Billheimer et al. ............ 706/45 |

* cited by examiner

*Primary Examiner*—Sanjiv Shah
(74) *Attorney, Agent, or Firm*—Whitham, Curtis & Christofferson, P.C.; Stephen C. Kaufman

(57) ABSTRACT

A method of automatically labeling of unlabeled text data can be practiced independent of human intervention, but that does not preclude manual intervention. The method can be used to extract relevant features of unlabeled text data for a keyword search. The method of automated labeling of unlabeled text data uses a document collection as a reference answer set. Members of the answer set are converted to vectors representing centroids of unknown groups of unlabeled text data. Unlabeled text data are clustered relative to the centroids by a nearest neighbor algorithm and the ID of the relevant answer is assigned to all documents in the cluster. At this point in the process, a supervised machine learning algorithm is trained on labeled data, and a classifier for assigning labels to new text data is output. Alternatively, a feature extraction algorithm may be run on classes generated by the step of clustering, and search features output which index the unlabeled text data.

5 Claims, 4 Drawing Sheets

AUTOMATIC LABELING OF UNLABELED TEXT DATA

BACKGROUND OF THE INVENTION

1. Field of the Invention

The present invention generally relates to a method of automated labeling of unlabeled text data and, more particularly, to a method that assigns labels without manual intervention and can also be used to extract relevant features for a keyword search of the data.

2. Background Description

Very often, organizations have large quantities of machine readable text documents to which they would like to assign labels for such purposes as developing a categorizer for new texts, enabling the retrieval of old texts, and the like. These text documents could be various electronic documents, including, among other things, Web pages (the World Wide Web (WWW) portion of the Internet, or simply "the Web"), electronic mail (i.e., e-mail), a collection of Frequently Asked Questions (FAQs). Current solutions to labeling such text documents usually include a large amount of costly manual labor, and cannot be completely automated (e.g., they require manual intervention).

SUMMARY OF THE INVENTION

It is therefore an object of the invention to provide a method of automatically labeling of unlabeled text data, independent of human intervention, but that does not preclude manual intervention.

It is another object of the present invention to provide a method to extract relevant features of unlabeled text data for a keyword search; that is, an automatic method of adding appropriate linguistic variants as part of an indexing mechanism.

According to the invention, there is provided a method of automated labeling of unlabeled text data. A document collection is established as a reference answer set. A label, e.g., the URL of a Web page, is attached to each document. Members of the answer set are converted to vectors representing centroids of clusters of documents. Unlabeled text data are categorized relative to the centroids by a nearest neighbor algorithm. Then, a supervised machine learning algorithm is trained on the newly labeled data, and a categorization classifier (e.g., a rule based classifier) classifies the data for each cluster. Alternatively, a feature extraction algorithm may be run on classes generated by the step of categorizing, and search features output which index the unlabeled text data.

Although the invention contemplates a fully automated process of categorizing unlabeled text data or extracting relevant features from the unlabeled text data for keyword search, human intervention may optionally be used to further refine the process. For example, the automated categorizations might be manually checked and updated by shifting documents from one cluster to another and thereafter the data re-categorized using a nearest neighbor algorithm. These steps would then be iterated until the process stabilizes or some iteration parameter reached. Also, the document collection established as the reference answer set might be manually augmented and/or edited with additional information useful to the categorization process, e.g., synonyms of words occurring in the documents.

The method of this invention may use information from several disparate and separate sources, such as a Web site, a database of Frequently Asked Questions (FAQs), and/or databases of other document collections, a the reference answer set. Sets of related Universal Resource Locators (URLs) could also be used in the categorization process.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
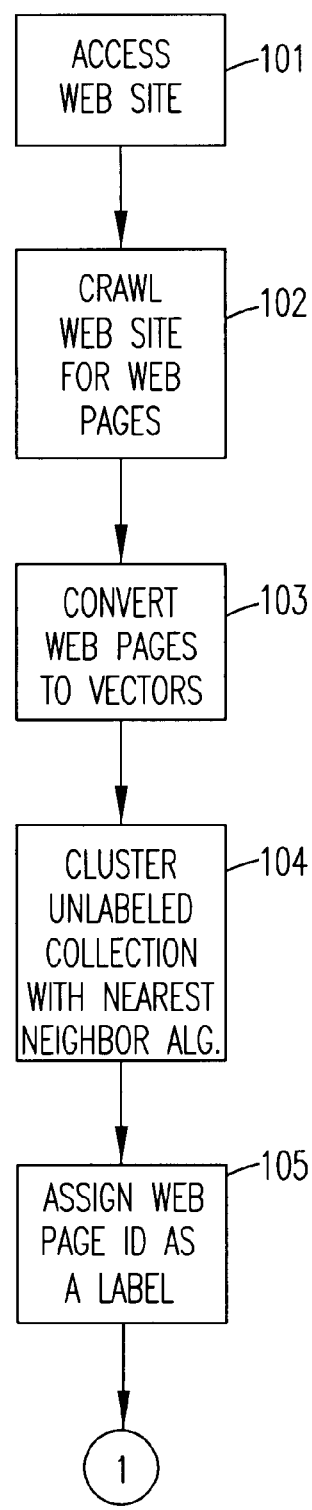
FIG. 1 is a flow diagram illustrating the basic process of automated labeling of unlabeled text data according to the invention.

Referring now to the drawings, and more particularly to FIG. 1, there is shown the basic process of automated labeling of unlabeled text data according to the invention. In this example, it is assumed that the answers are Web pages identified by URLs. The process begins by accessing a Web site in function block 101. Then in function block 102, the Web site is crawled to generate a set of responses (i.e., Web pages). This set of responses are a set of Web pages. The Web pages (answers) are converted to vectors (the centroids) by any known method in function block 103. Auxiliary unlabeled documents (e-mails, scanned facsimile transmissions or letters, outputs of a speech recognition process, e.g., calls, and the like) are clustered with respect to the centroids by any nearest neighbor algorithm in function block 104. Labels are assigned in function block 105.

Figure 2:
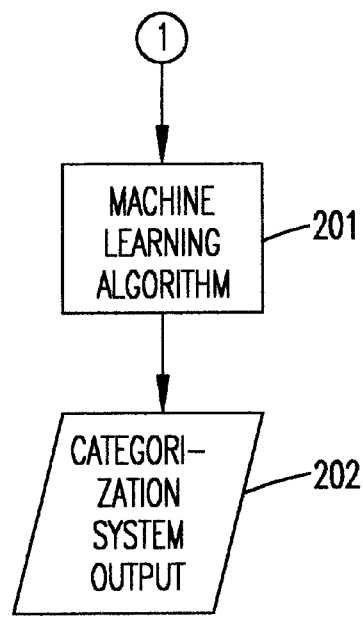
FIG. 2 is a flow diagram illustrating the steps added to the basic process illustrated in FIG. 1 used to develop a categorizer.

FIG. 2 builds on this basic process to develop a categorizer. Beginning at connector ① in FIG. 1, a supervised machine learning algorithm of choice is trained on labeled data in function block 201. The categorization system output is provided at output block 202.

Figure 3:
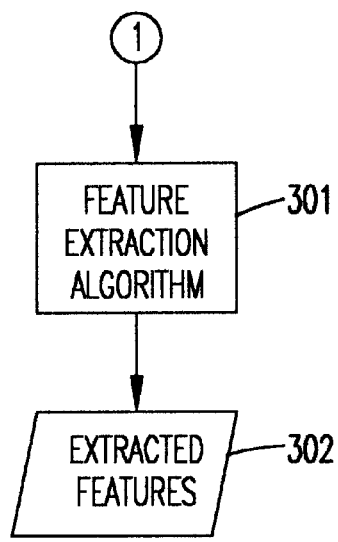
FIG. 3 is a flow diagram illustrating the steps added to the basic process illustrated in FIG. 2 used for enhanced feature extraction.

Alternatively, the basic process of FIG. 1 can be used for enhanced feature (keyword) extraction for setting up the indexing used by a search engine, as shown in FIG. 3. Again, beginning at connector ① in FIG. 1, a feature extraction algorithm is run in function block 301 on classes developed in the categorization process of function block 104. The extracted search features (keywords) indexing Web pages are provided at output block 302.

Figure 4:
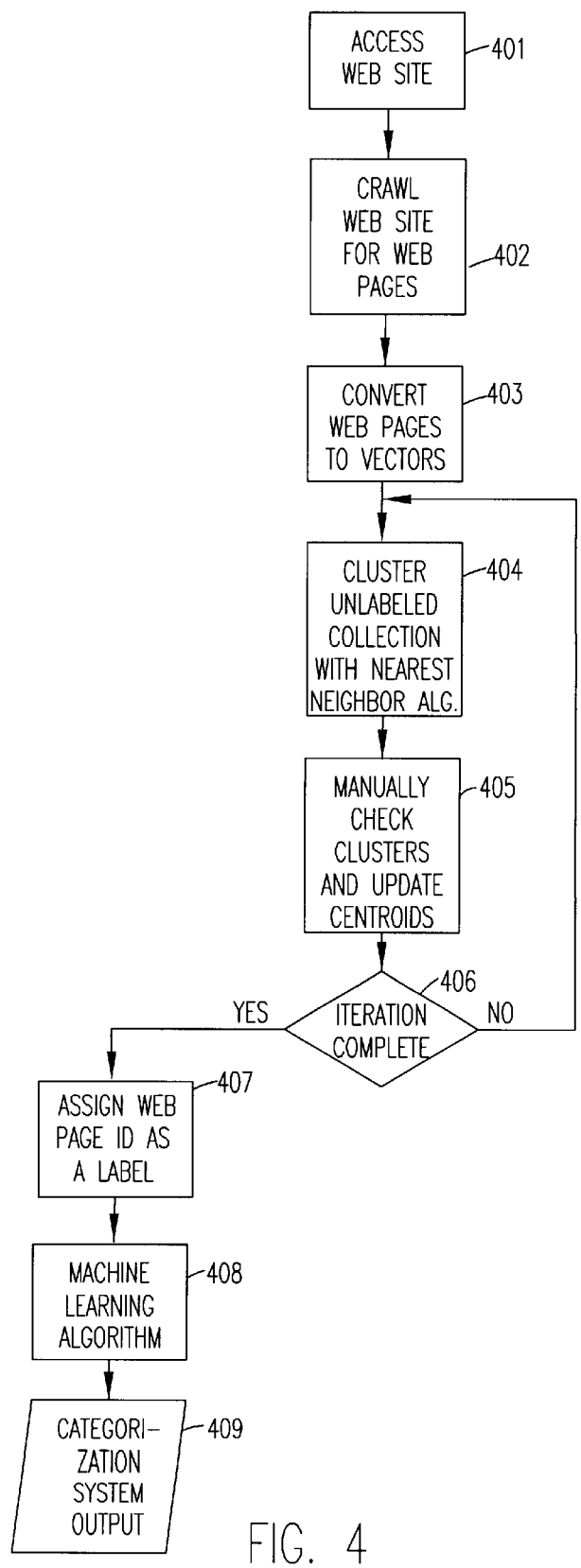
FIG. 4 is a flow diagram illustrating a modification of the process of FIGS. 1 and 2 to allow for optional manual intervention to refine the categorization process.

The process as generally illustrated in FIGS. 1 and 2 can be enhanced by manual intervention. The modified process is shown in FIG. 4. Again, it is assumed that the answers are Web pages. The process begins by accessing a Web site in functional block 401. Then in function block 402, the Web site is crawled to generate a set of responses (i.e., Web pages). This set of responses are a set of answers. The Web pages (answers) are converted to vectors (the centroids) by any known method in function block 403. Auxiliary unlabeled documents (e-mails, scanned facsimile transmissions or letters, outputs of a speech recognition process, e.g., calls, and the like) are clustered with respect to the centroids by any nearest neighbor algorithm in function block 404.

At this point in the process, selected clusters may be manually checked and the centorids updated in function block 405. Then in decision block 406, a determination is made as to whether the iteration has stabilized or an iteration parameter has been reached. If not, the process loops back to function block 404 to re-cluster the data using the nearest neighbor method. When the iteration process has stabilized or an iteration parameter has been reached as determined in decision block 406, labels are assigned in function block 407 and a supervised machine learning algorithm of choice is trained on labeled data in function block 408. The categorization system output is provided at output block 408.

Figure 5:
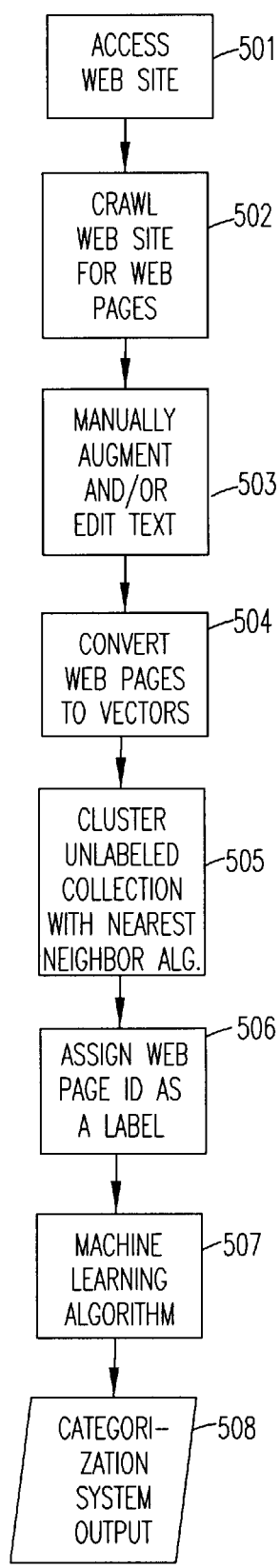
FIG. 5 is a flow diagram illustrating a modification of the process of FIGS. 1 and 2 to allow for optional manual intervention for inspecting and augmenting information in the reference set to provide higher quality results.

The invention can also be practiced by using sets of related Web pages in the categorization process and manually inspecting and augmenting the Web pages to provide higher quality results. This option is illustrated in FIG. 5. The process begins by accessing a Web site in function block 501. Then in function block 502, the Web site is crawled to generate a set of responses (i.e., Web pages). This set of responses are a set of answers. The text from the Web pages is then manually augmented and/or edited with information useful to categorization in function block 503. The Web pages (answers) are converted to vectors (the centroids) by any known method in function block 504. Auxiliary unlabeled documents (e-mails, scanned facsimile transmissions or letters, outputs of a speech recognition process, e.g., calls, and the like) are clustered with respect to the centroids by any nearest neighbor algorithm in function block 505. Labels are assigned in function block 506. A supervised machine learning algorithm of choice is trained on labeled data in function block 507. The categorization system output is provided at output block 508.

In a preferred embodiment, the invention is used when an organization or business has a Web site in which some pages can be taken as an answer to incoming queries. For example, a bank may have a Web page describing the types of available mortgage loans. This particular Web page could be taken as the answer to a question such as, "What types of mortgages do you have?"

In the above example, the archive of the machine readable texts could be a collection of electronic mail documents (i.e., e-mails) received by the bank. Each archived document is assigned to one or more clusters depending on the computed distance to one of the answer centroids. An identification (ID) assigned to each Web page would then be assigned to the archived documents in a cluster with the Web page Uniform Resource Locator (URL) as a label. In one embodiment, the web page URL may serve as the ID. Once the collection is labeled, it is suitable for use as the input to a supervised learning method, or for a topic search system, etc.

In another embodiment, the invention can also support a scenario in which a person checks some of the labels determined by the above process, and the correct cases are used to update the original centroid and the incorrect cases are thrown out. Although this embodiment involves some manual effort, the total amount of effort would be less than labeling a document collection without a "reference centroid".

It should be emphasized that a Web browser is not required to practice the invention. For example, instead of a Web site, the invention can also be practiced by using any document collection, such as a FAQ database as the reference answer set, and use the same process to build categorization systems or keyword indexers for that document collection.

While the invention has been described in terms of preferred embodiments, those skilled in the art will recognize that the invention can be practiced with modification within the spirit and scope of the appended claims.

Having thus described our invention, what we claim as new and desire to secure by letters patent is as follows:

1. A method of automated labeling of unlabeled text data comprising the steps of:

establishing a document collection as a reference answer set;

converting members of the answer set to vectors representing centroids of unknown groups of unlabeled text data;

clustering unlabeled text data relative to said centroids by a nearest neighbor algorithm;

assigning an ID to each said centroid; and labeling each of the unlabeled text data documents with said ID of the answer in the cluster to which the unlabeled text data document has been assigned by said clustering step.

2. The method of automated labeling of unlabeled text data recited in claim 1, further comprising the steps of:

training a supervised machine learning algorithm on the newly labeled data; and outputting a classifier for assigning labels to new text data.

3. The method of automated labeling of unlabeled text data recited in claim 1, further comprising the steps of:

running a feature extraction algorithm on classes generated by the step of clustering; and outputting search features indexing the unlabeled text data.

4. The method of automated labeling of unlabeled text data recited in claim 1, further comprising the steps of:

checking selected categorizations and recalculating centroids;

re-clustering data using the nearest neighbor algorithm;

iterating the steps of checking and re-categorizing until process stabilizes or an iteration parameter is reached;

training a supervised machine learning algorithm on the newly labeled data; and outputting a classifier for assigning labels to new text data.

5. The method of automated labeling of unlabeled text data recited in claim 1, further comprising the step of augmenting and/or editing text from the document collection as the reference answer set with additional information before converting the reference set to vectors.

* * * * *